May 12, 1936. O. O. CECCARINI 2,040,244
IMPROVED MOTION PICTURE CAMERA
Filed Jan. 31, 1930 2 Sheets-Sheet 1

Inventor
Olindo O. Ceccarini

By Lyon & Lyon Attorneys

May 12, 1936.  O. O. CECCARINI  2,040,244
IMPROVED MOTION PICTURE CAMERA
Filed Jan. 31, 1930   2 Sheets-Sheet 2

Inventor
Olindo O. Ceccarini
By Lyon & Lyon
Attorneys

Patented May 12, 1936

2,040,244

UNITED STATES PATENT OFFICE 2,040,244

IMPROVED MOTION PICTURE CAMERA

Olindo O. Ceccarini, Beverly Hills, Calif., assignor to Metro-Goldwyn-Mayer Corporation, Culver City, Calif., a corporation of New York Application January 31, 1930, Serial No. 424,840

2 Claims. (Cl. 88—16.2)

This invention relates to a device for use on motion picture cameras for the purpose of making marks of identification on the films being exposed in the cameras. When a plurality of cameras are operated concurrently on the same set or scene, marks of identification can be made on all of said films being exposed in said cameras, said marks being in synchronism with each other.

The device of this invention may be used not only in making marks of identification on films being exposed in the motion picture cameras, but also on sound records being recorded concurrently therewith.

In photographing scenes it has been found desirable to employ more than one camera so that close-ups and long shots or views from a different angle may be obtained.

In the final completed film, cuts are made from the film produced by one camera to the film produced by another camera, thereby changing the observer's point of view or his distance from the scene being photographed. Such cuts may be instantaneous, or they may be what is known as lap-dissolves in the art. In other words, the view may merge and blend from one angle to another angle or from a long shot to a close-up.

The director in charge of production during the photographing of a set or scene may be desirous of indicating where he desires to have the final film switch from a long shot to a close shot, or from one point of view to another point of view. Heretofore the cutter (operators who cut out the desired portions of film from the various cameras and connect said portions together in their proper sequence, so as to produce a final film), have had to conduct their operations with the aid of elaborate notes, memoranda and the like. It is rather difficult to identify a particular portion of a film so as to make certain that that is the point at which the director desires to have the change or switch made.

The difficulties of cutting and assembling the various films becomes more pronounced when sound films are taken simultaneously with the pictures. When sound records are being taken, extreme care has to be executed so that the picture films are properly cut so that the continuity of the picture record is not impaired, and the possibility of shortening the picture record with respect to the sound record must be carefully avoided.

The device of this invention may be readily attached to any camera. The device receives the film and exposes the edge of the film to form a distinguishing mark thereon. The mark may be formed either between the perforations or exteriorly of the perforations. When the film is to be used for both sound and picture records, the marks are made on that side of the film away from the edge which may later be employed in carrying the sound record.

The term "set" or "scene" is to be understood to define any suitable scene, set, interior or exterior containing or including actors or devoid of actors. Furthermore, the plurality of motion picture cameras photographing such a set or scene may have their lenses directed upon substantially the same point in said set or scene, or said cameras may be photographing different portions of the same set or scene, or different parts thereof, that is, different portions of the total continuity of the scene.

An object of this invention is to disclose and provide an apparatus which is extremely simple and which effectively permits marks of identification to be made on a plurality of films simultaneously.

Another object is to disclose and provide a device adapted to be readily introduced into cameras of any make or construction, for the purpose of forming an identifying mark in the edge of sensitive film in said camera.

Another object is to disclose and provide means whereby a mark of identification may be made on a plurality of separate films in separate cameras from any one desirable point.

In describing the invention, reference will be had to the appended drawings, in which.

Figure 1:
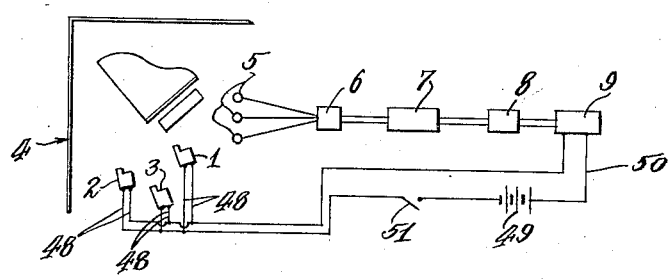
Fig. 1 is a diagrammatic representation of a general arrangement of cameras, set or scene, and sound recording equipment as may be employed in carrying out this invention.
Figure 3:
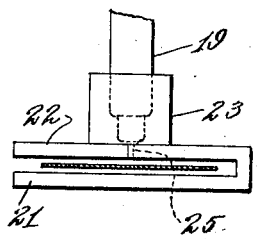
Fig. 3 is an end view showing in more detail the construction of the light spotting device as used in the sound recording apparatus.

As shown in Fig. 1, a plurality of separate motion picture cameras 1, 2 and 3 may be suitably positioned and directed upon a set 4. The cameras 1, 2 and 3 may be provided with lenses of different focal length so as to obtain close-ups or long shots, or they may be angularly displaced with relation to each other so as to obtain different views. Any number of cameras may be employed. These various cameras may be operated synchronously or they may be operated independently so that each camera takes but a portion of the total continuity of the action being photographed. Preferably, the latter arrangement is employed so that the subsequent splicing of the films obtained by the three separate cameras does not render useless as much film footage.

Figure 2:
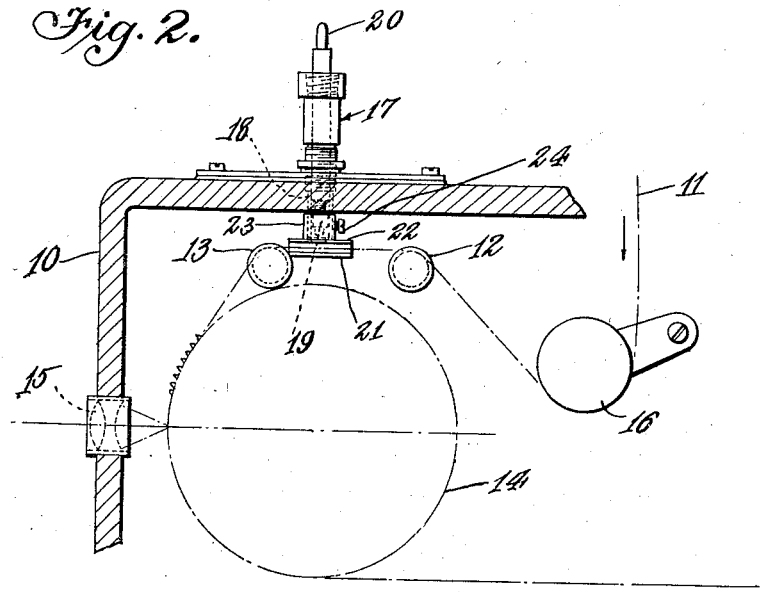
Fig. 2 is an enlarged view of a portion of a sound recording device.
Figure 4:
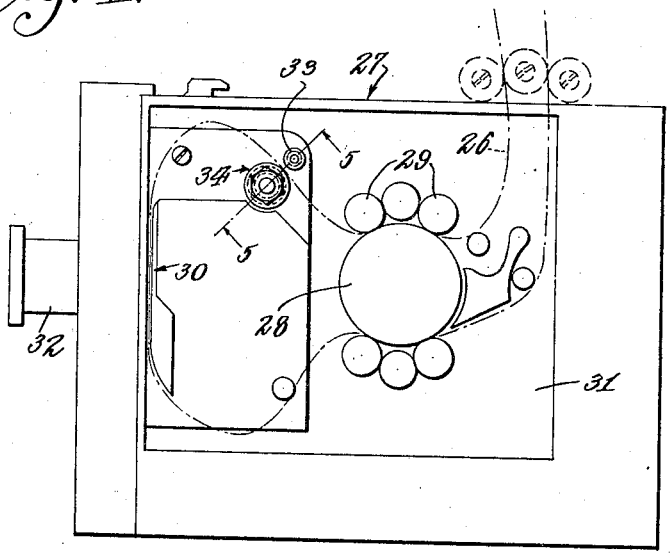
Fig. 4 is a diagrammatic representation of a motion picture camera, showing the location of the light spotting device in said camera.

If sound records are to be obtained of the action on the set 4, a plurality of microphones 5 may be provided, said microphones leading to a mixer and gain apparatus 6 from which the signal current is then passed through suitable amplifiers 7 and attenuators 8 from which the signal current is then supplied to a recording device 9. The details of the recording device need not be given here, as the invention does not concern the actual translation of sound waves into electrical energy and then into visual representation of the sound. As shown in Fig. 2, however, the sound recording apparatus generally comprises a case 10 into which light sensitive film 11 is supplied, said light sensitive film passing over rollers 12 and 13 and then over a large sprocket 14. Modulated light is passed through a suitable objective lens 15 which focuses the light onto the film 11 as it passes over the sprocket 14, thereby forming the sound record. The exposed film 11 is then wound upon a suitable reel, developed and printed. A weighted roller 16 or other means for maintaining the film 11 under proper tension may be provided.

Means for fogging or marking the sound film 11 may comprise a holder 17 passing through the case 10 and terminating in a tube 18 in which an auriscope 19 is positioned, electrical contacts extending through the member 17 into a suitable terminal 20.

In order to prevent the light from the auriscope from affecting the portion of the film 11 on which the sound record is to be subsequently impressed, a mask consisting of a lower portion 21 and an upper portion 22, spaced therefrom may be provided. The upper portion 22 is preferably integrally connected to a collar 23 adapted to be adjustably positioned upon the tube 18 as by means of the set screw 24. A minute aperture 25 is formed in the upper member 22 so as to permit light from the auriscope 19 to pass upon the film 11. Preferably, the device is positioned so as to embrace the film 11 at a point between the rollers 12 and 13, sufficient space being provided between the upper and lower sections of the masking device so as to prevent the film 11 from touching said device.

In motion picture cameras the sensitive film 26 passes from a suitable magazine into the main portion of the camera, indicated at 27, then contacts with a driving sprocket 28 with which it is maintained in contact by suitable rollers 29, and then normally passes over one or more rollers before passing through the gate and into the shutter mechanism indicated generally at 30. The exposed film then passes over suitable rollers back into the magazine.

A partition 31 extending in a plane parallel to the axis of the lens 32 of camera 27 generally divides the gate and shutter mechanism from the gearing and drive mechanism, and the rollers 28, 29 and others are mounted on spindles and shafts connected to or journaled in said partition 31. In accordance with this invention, the film 26 preferably passes between an idler roller 33 and a roller 34, the rollers being mounted in close proximity to each other so as to maintain the film 26 in substantial contact with the roller 34.

Figure 5:
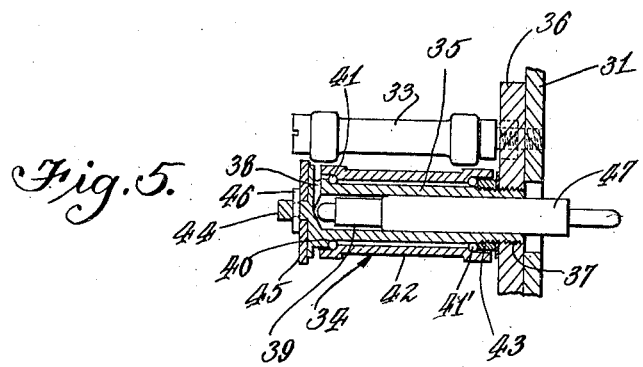
Fig. 5 is a vertical section taken through the light spotting device shown in Fig. 4.

The roller 34, as shown in Fig. 5, may consist of a hollow stud 35 threadedly attached to a plate 36, which in turn is connected to the partition 31, said threaded connection being indicated at 37. The stud 35 may be provided with an aperture 38 leading from the interior cavity 39 to its edge, said port or opening 38 being from between one-sixteenth to three thirty-seconds of an inch in diameter.

The stud 35 may be provided near its outer edge and near the aperture 38 with a shoulder 40 adapted to form a race for ball bearings 41 which maintain roller 42 rotatably mounted on the stud 35. A ball retaining ring 43 may also be mounted on the stud 35 near the partition 31 so as to maintain another set of ball bearings 41' in position near that end.

The stud 35 may be provided axially thereof with an extension 44. A disc 45 may be journaled on said extension and prevented from falling off by means of a pin 46. Said disc 45 preferably extends above the roller 42 so as to prevent film passing over said roller from slipping off. An auriscope lamp 47 is preferably positioned in the cavity 39 of the stud 35, the terminals of said auriscope extending into the driving compartment of the camera and provided with suitable leads 48 leading therefrom.

As shown in Fig. 1, the leads 48 from the various cameras 1, 2 and 3 may form a part of a circuit including a battery or other source of electrical energy 49. The circuit may also include leads 50 leading to the auriscope in the sound recording device illustrated in Fig. 2. At any desired point in the circuit a switch 51 may be provided.

Preferably, the switch 51 is under the control of a director or his assistant, so that during the photographing of a set by the various cameras 1, 2 and 3, the director may, by closing switch 51, cause the various auriscope lamps in the cameras to be energized. Sensitive film passing over the rollers 34 containing the auriscopes will thus be exposed at their edges.

It is to be noticed that the passage-way 38 leads to the extreme edge of the film and, therefore, only a portion of the film exteriorly of the picture area and preferably exteriorly of the perforations is exposed. All cameras in the circuit will, therefore, have their films simultaneously marked and such marks will be in synchronism with the sound record if the sound recording machine and its fogging lamp is connected to the circuit which is closed by the switch 51.

The longitudinal axis of the passage-way 38 is preferably directed toward the axis of the roller 33, so that the light emitted through such passage-way is directed substantially at right angles to the film 26, passing between said roller 33 and the stud roller 34. In this manner the possibility of causing the light from the auriscope 47 to expose the picture areas of the film is obviated.

Films marked synchronously as described hereinabove may be readily assembled by the cutter into a final film, and the precise frame at which the splice is to be made can be readily identified by the mark made in the edge of the film.

The electrical circuit may be changed somewhat so that each camera may be spotted independently of the other camera, or the cameras may be caused to be spotted simultaneously without spotting the sound record.

Furthermore, it will be readily understood that each camera may be spotted independently of other cameras, and still produce a light spot on the sound record.

It is to be understood that this invention is not limited to the precise details given hereinabove, but includes all such modifications as come within the scope of the appended claims.

I claim:

1. In a motion picture camera, a substantially cylindrical hollow stud provided with one closed end and one open end, an axial bore in said stud, threads formed in the outer surface of said stud at its open end whereby said stud may be threadedly connected to a longitudinally directed wall in a camera, a radially extending shoulder carried by said stud at the closed end thereof, a freely rotatable substantially cylindrical sleeve carried by said stud, said sleeve being of substantially the same diameter as said radially extending shoulder, said sleeve being spaced from said shoulder axially of said stud, a radial light passage in said stud from said bore to a point between said shoulder and sleeve, means for illuminating said axial bore of said stud, and means for maintaining light sensitive film substantially in contact with said sleeve.

2. In a motion picture camera, the combination of a substantially cylindrical hollow stud provided with one closed end and one open end, an axial bore in said stud, threads formed in the outer surface of said stud at its open end, whereby said stud may be threadedly connected to a longitudinally directed wall in a camera, a radially extending shoulder carried by said stud at the closed end thereof, a freely rotatable substantially cylindrical sleeve carried by said stud, said sleeve being of substantially the same diameter as said radially extending shoulder, said sleeve being spaced from said shoulder axially of said stud, a radial light passage in said stud from said bore to a point between said shoulder and sleeve, means for illuminating said axial bore of said stud, and a freely rotatable disc carried by the closed end of said stud and extending beyond said shoulder for preventing lateral movement of film on said sleeve.

OLINDO O. CECCARINI.